US006621638B2

(12) United States Patent
Lissotschenko

(10) Patent No.: US 6,621,638 B2
(45) Date of Patent: Sep. 16, 2003

(54) PROCESS FOR PRODUCING A MICROOPTICAL FUNCTIONAL UNIT

(75) Inventor: Vitalij Lissotschenko, Dortmund (DE)

(73) Assignee: Hentz-Lissotschenko Patentverwaltungs GmbH & Co. KG (DE)

( * ) Notice: Subject to any disclaimer, the term of this patent is extended or adjusted under 35 U.S.C. 154(b) by 48 days.

(21) Appl. No.: 09/989,082

(22) Filed: Nov. 21, 2001

(65) Prior Publication Data

US 2002/0075568 A1 Jun. 20, 2002

(51) Int. Cl.⁷ ................................................ G02B 27/10
(52) U.S. Cl. ....................................... 359/621; 359/619
(58) Field of Search ................................ 359/642, 619, 359/664, 621, 622, 628, 819, 815, 811

(56) References Cited

U.S. PATENT DOCUMENTS

| 5,208,700 A | 5/1993 | Harris et al. |
| 5,214,535 A | 5/1993 | Harris et al. |
| 6,049,430 A | 4/2000 | Heanue et al. |

FOREIGN PATENT DOCUMENTS

| DE | 24 15 495 | 3/1974 | |
| DE | 25 49 461 | 10/1975 | |
| DE | 196 10 881 | 3/1996 | |
| DE | 196 44 758 | 10/1996 | |
| GB | 2195785 A | * 4/1988 | ............ G02B/6/30 |
| JP | 08271774 | 10/1996 | |

OTHER PUBLICATIONS

Morey, Jennifer L. : Microlens Arrays. In: Photonics Spectra, Dec. 1997, S. 110–112, 114.

* cited by examiner

Primary Examiner—Georgia Epps
Assistant Examiner—Mohammad Abutayeh
(74) Attorney, Agent, or Firm—Hoffman, Wasson & Gitler PC

(57) ABSTRACT

Process for producing a microoptical functional unit which is made of at least two interconnected flat parts which each are one optical functional elements. The interconnected two flat parts are provided with a number of optically functional sections ane, on the sides of the flat parts facing one another positioning aids are formed which facilitate alignment of at least two flat parts to one another.

12 Claims, 3 Drawing Sheets

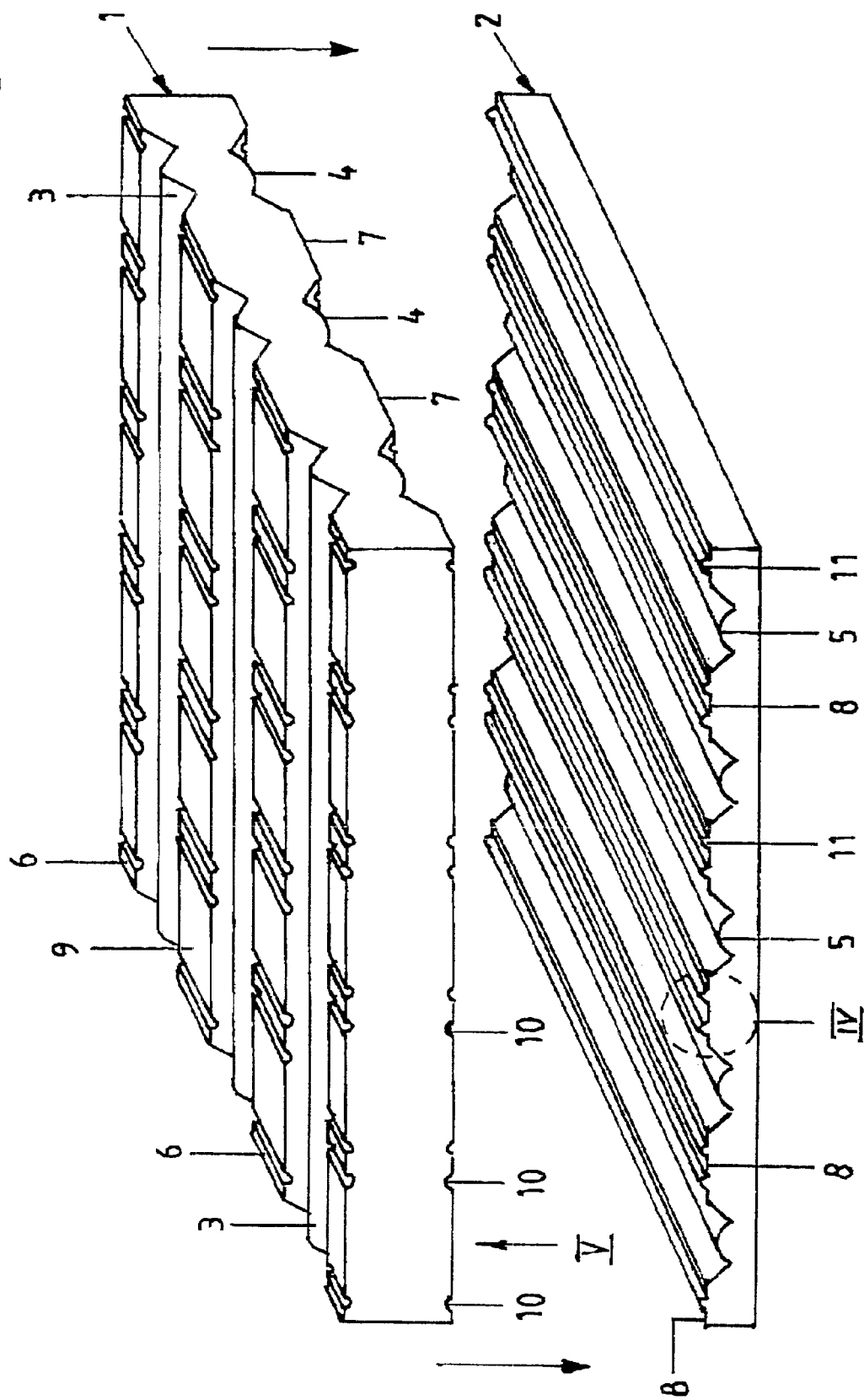

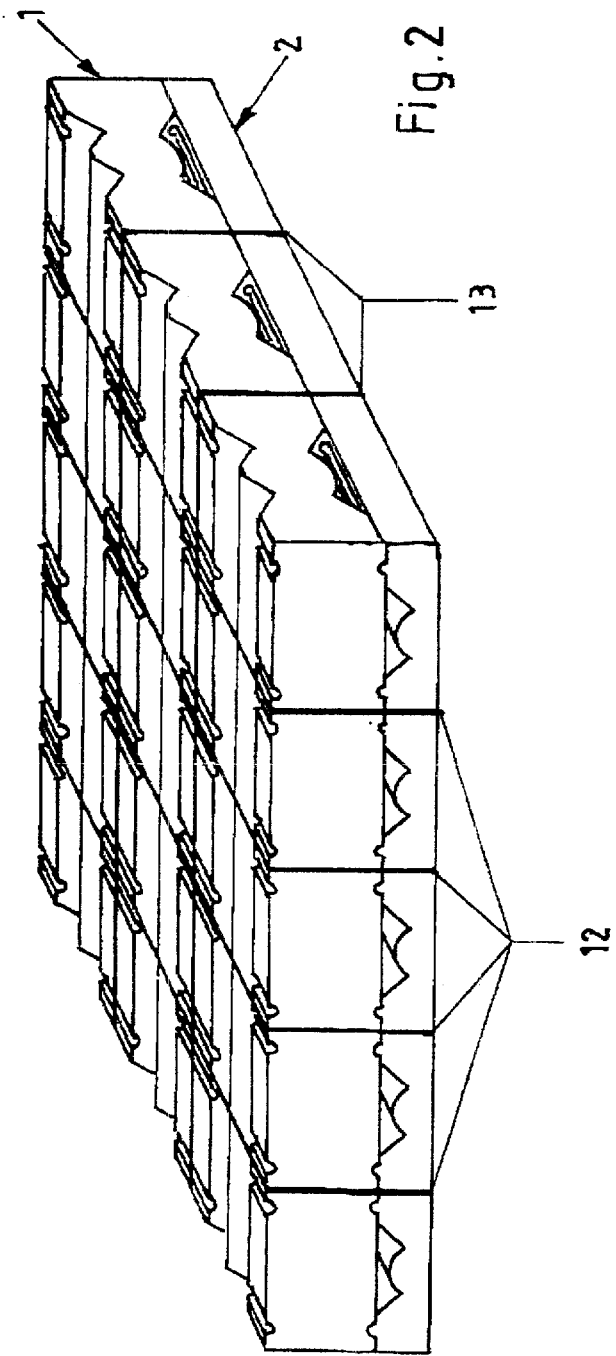
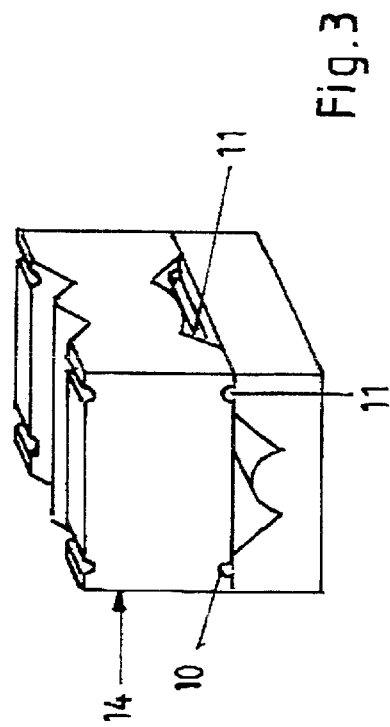

PROCESS FOR PRODUCING A MICROOPTICAL FUNCTIONAL UNIT

BACKGROUND OF THE INVENTION

This invention relates to a process for producing a microoptical functional unit which includes at least two interconnected parts each of which have at least one optical functional element, for production at least two flat parts being provided with a number of optically functional sections. The flat parts are connected to one another and step at least one microoptical functional unit being cut out of the interconnected flat parts.

A process of the aforementioned type is known for example from US patent U.S. Pat. No. 6,049,430. In the process described therein, two wafer-like parts are provided with optical functional elements and are joined to one another with UV-settable adhesive. The disadvantage of the aforementioned process is that a major cost must be borne to exactly position the optical functional elements of one flat part, which are made on the wafer-like parts, to those of the other flat part such that one microoptical functional unit with the desired properties is formed.

The object of the present invention is to devise a process, of the initially mentioned type, in which optically functional sections made on different flat parts can be positioned, easily in retention to one another, in the desired manner during the production process.

SUMMARY OF THE INVENTION

This result is achieved in that on the sides of the flat parts facing one another, positioning aids are formed which facilitate alignment of at least two flat parts to one another. Due to the presence of the positioning aids, the macroscopic flat parts can be aligned to one another according to desired stipulations, and the positioning aids can be chosen such that, as a result of correct alignment of the flat parts to one another, the functional sections of the respective microoptical functional unit are positioned exactly to one another.

It can furthermore be provided as depicted in the invention, that on at least one side of at least one of the parts, i.e., the side facing the other part, positioning aids are formed which can be used as cutting aids for cutting out at least one microoptical functional element from the interconnected parts. In this way the working process of subdivision of the flat parts which have been connected to one another into individual functional units is greatly simplified.

According to one preferred embodiment of this invention, on the sides of the flat parts facing one another, contact surfaces can be formed which adjoin one another after connection, the positioning aids being located on these contact surfaces. By forming the positioning aids in surfaces which adjoin one another, after moving the flat parts onto one another they can be pushed against one another until the corresponding position of the parts to one another is achieved.

Advantageously, the positioning aids contain lengthwise grooves on one of the parts and lengthwise projections which correspond to them on the other of the parts. This configuration of the positioning aids represents a very simple, but effective embodiment. Furthermore, these lengthwise grooves and lengthwise projections can be formed very economically.

The flat parts can be connected to one another using common connection methods such as cementing, soldering or welding.

In particular, it can be provided that the flat parts are made of a material which is at least partially transparent in the wavelength range of interest for the operation of the finished microoptical functional units. In this case, optically functional sections which are molded on at least one of the flat parts as lens surfaces can be formed. Advantageously, the lens surfaces can be made as cylinder lenses which extend essentially over the entire width or length of the respective flat part. These structures can be formed relatively easily in terms of production engineering.

It is also contemplated to provide mirrors, filters, prisms, or the like, as optically functional sections.

According to one preferred embodiment of this invention, the optically functional sections, made on at least one of the flat parts, in at least one direction which lies in the surface of the flat part, have properties which differ from one another relative to one optical parameter so that microoptical functional units with different properties can be cut out of the interconnected parts. Here the properties of the optically functional sections, on at least one of the flat parts can vary over the length, and/or the width, of at least one part, such that a microoptical functional unit with the desired properties can be cut out of the interconnected parts using an addressable selection process. Thus, the flat parts can be joined to one another and for a corresponding custom requirement, one or more functional units with exactly definable properties can be cut out of the wafer-like structure. One such process represents a very economical possibility for producing custom microoptical functional units.

Preferably, over the length, and/or width, of at least one of the flat parts, the index of refraction of the material used or the focal length of the optically functional sections which are made as lens surfaces can be varied. In one, or both of the aforementioned versions, for example, by means of the aforementioned addressable selection process, microoptical functional units with lenses with different indices of refraction can be selectively cut out according to the desired specification.

BRIEF DESCRIPTION OF THE DRAWINGS

Other features and advantages of this invention become clear based on the following description of preferred embodiments with reference to the attached figures:

FIG. 1 shows a perspective schematic view of two flat parts to be joined in a first process step as claimed in the invention;

FIG. 2 shows a view according to FIG. 1 after joining and before cutting the parts;

FIG. 3 shows a perspective view of a microoptical functional unit produced using the process as claimed in the invention;

DETAILED DESCRIPTION OF THE INVENTION

Figure 4:
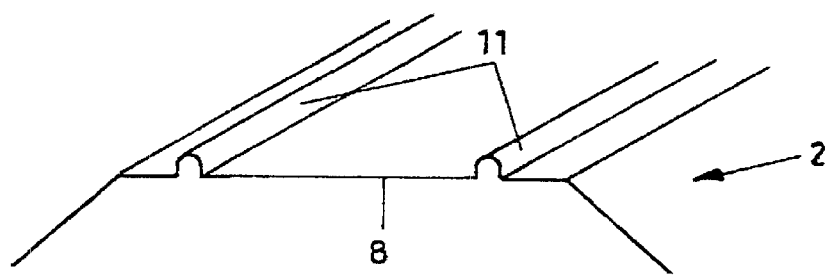
FIG. 4 shows a detailed view according to the circle labelled IV in FIG. 1.

In the process as depicted by the invention, shown in FIGS. 1 and 2, from relatively extended wafer-like flat parts 1, 2 of a material, which is at least partially transparent in the wavelength range of interest, there is depicted a finished microoptical functional unit. The unit can be, for example, quartz glass, or the like. Both, or only one, of the extended surfaces of the flat parts 1, 2, at a time, can be treated using a production process as is described, for example, in German patent disclosure document DE 196 10 881 A1 such that the lens surfaces 3, 4, 5 are produced according to FIG. 1. In one such production process the quartz glass surfaces can be roughly shaped, for example, by means of ultrasonic machining. To produce the periodically recurring lens structures shown in FIG. 1, large-surface machining forms can be used, which have functional elements located next to one another for ultrasonic machining.

The ultrasonic machining can then be followed by another process step in which the lens surfaces 3, 4, 5 can be polished by means of a high energy electron beam.

In the embodiment shown, the first flat part 1, on its two extended surfaces, has lens surfaces 3, 4 which in the embodiment shown are made as differently shaped cylinder lenses which are aligned parallel to one another and are opposite one another. In the embodiment shown, the cylinder lenses made on the first flat part 1 each extend over the entire width of the flat part 1. Between the lens surfaces 3, 4 on the respective extended surface of the flat part 1 there are contact surfaces 6, 7 which are essentially parallel to the plane of extension of the flat part, which extend in the direction of the cylinder axes, and which with respect to their thickness project over or under the lens surfaces 3, 4.

On the second flat part 2, in the embodiment shown, there are lens surfaces 5 and contact surfaces 8 only on the side facing the first flat part 1. The lens surfaces 5 are in turn cylinder lens surfaces which have cylinder axes which are aligned parallel to one another and in which one of the cylinder lenses at a time extends over the entire width of the flat part 2. Between the individual lens surfaces 5, there are contact surfaces 8 which in turn project upward over the lens surfaces 5.

The embodiment of the two flat parts 1, 2 shown in FIG. 1 is an example and can be varied. It is possible, for example, to provide only one of the two extended surfaces with lens surfaces 3, 4 and contact surfaces 6, 7 for the flat part 1. Furthermore, it is also possible for the flat part 2 to provide both extended sides with lens surfaces 5 and contact surfaces 8, regardless of whether for the flat part 1, one, or both sides are provided with the corresponding functional surfaces.

In the embodiment shown in FIG. 1, the cylinder lenses provided on the second flat part 2 are aligned perpendicular to the cylinder lenses provided on the first flat part 1. It is also possible to align the cylinder lenses in directions parallel to one another on both parts 1, 2. Furthermore, it is also possible to arrange the cylinder lenses at other than a right angle. In addition, it is also possible to provide not cylindrical, but spherical lens surfaces, or the like, in sections. Moreover, instead of lens surfaces, prism surfaces can also be made in the flat surfaces of the parts 1, 2. Instead of lenses or prisms, also mirrors or filters can be used as functional surfaces. It is not the structuring of the functional surfaces on the parts 1, 2 which is essential to the invention, but the fact that on the parts 1, 2, the desired type of functional surfaces is present, either on one side and/or on both sides.

Figure 5:
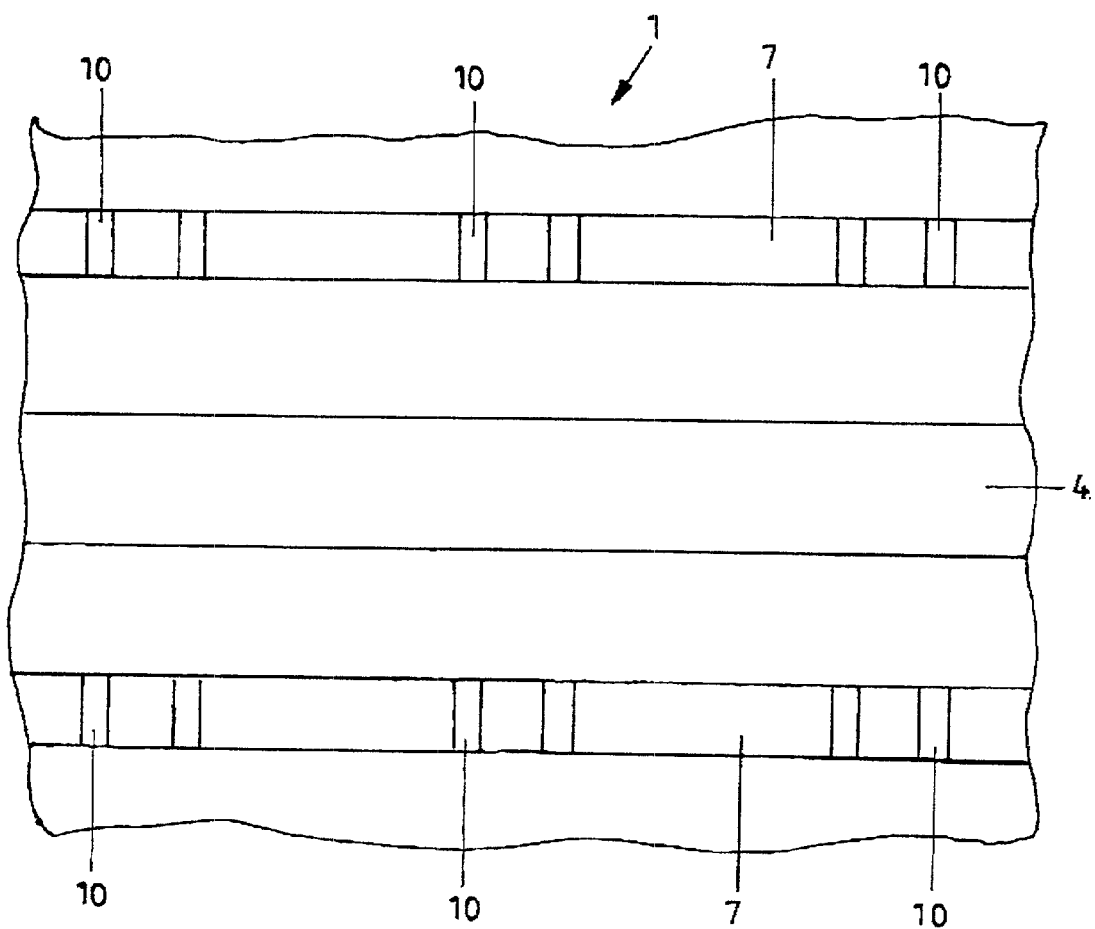
FIG. 5 shows a detailed view according to arrow V in FIG. 1.

Furthermore, FIG. 1 and the detailed views in FIG. 4 and FIG. 5 show that positioning aids are mounted on the parts 1, 2. These positioning aids comprise lengthwise grooves 9, 10 which extend on the first of the parts 1 perpendicular to the cylinder lenses of the lens surfaces 3, 4 and also perpendicular to the lengthwise extension of the contact surfaces 6, 7. Lengthwise projections 11 which correspond to the lengthwise grooves 10 of the first flat part, which grooves are the bottom ones in FIG. 1, are mounted on the contact surfaces 8 of the part 2, as is clearly shown especially in FIG. 4.

When the two parts 1, 2 are joined, the lengthwise projections 11 fit into the lengthwise grooves 10 so that a given orientation of the functional surfaces made as lens surfaces 3, 4, 5 on the parts 1, 2 is ensured. The additional lengthwise grooves 9 located on the side of the first flat part 1 which is the top side in FIG. 1 can be used on the one hand for joining to a third or fourth flat part which is placed, for example, in the top of the first flat part 1. Furthermore, the lengthwise grooves 9 which are provided on the top of the first flat part 1 however can also be used to position a corresponding cutting tool on the top of the combined parts 1, 2.

The interconnection of parts 1, 2, after joining, can be done by typical connection processes such as, for example, cementing, soldering or welded.

After joining and interconnecting the parts 1, 2, microoptical functional units 14 similar to modules can be cut out by means of the aforementioned cutting device along the cut lines 12, 13.

It is also possible, as depicted in the invention to produce very different microoptical functional units 14 from the same initial parts 1, 2 by means of the process as depicted in the invention. To do this, for example, the focal lengths or other parameters of the formed functional surfaces, such as, for example, the lens surfaces 3, 4, 5, can be varied over the length and width of the parts 1, 2 or one of the parts 1, 2. Alternatively, for example, the index of refraction of the material used can be varied over the length and/or width of one or both of the parts 1, 2. In this variation of optical parameters of the functional surfaces, a microoptical functional unit 14 with the desired properties can be cut out of the joined parts 1, 2 for example by means of an addressable selection process.

What is claimed is:

1. A process for producing a microoptical unit which comprises interconnecting at least two flat parts to form at least two interconnected flat parts, each of the at least two flat parts comprise at least one optical functional element, wherein on sides of each of the at least two flat parts facing one another, positioning aids are formed which facilitate alignment and interconnection of the at least two flat parts to one another.

2. The process for producing a microoptical unit which comprises as claimed in claim 1, further comprising the step of cutting the interconnected flat parts to form the microoptical unit.

3. The process as claimed in claim 1, wherein on at least one side of at least one of the flat parts, the positioning aids are used as cutting aids for cutting out the microoptical functional unit from the at least two interconnected flat parts.

4. The process as claimed in claim 1, wherein on the sides of the at least two flat parts facing one another, contact surfaces are formed which adjoin one another after connection, the positioning aids being located on these contact surfaces.

5. The process as claimed in claim 1, wherein the positioning aids comprise lengthwise grooves on one of the flat parts and lengthwise projections which correspond to the groove on the other of the flat parts.

6. The process as claimed in claim 1, wherein the at least two flat parts are connected to one another by cementing, soldering or welding.

7. The process as claimed in claim 1, wherein the at least two flat parts comprise a material which is at least partially transparent in a wavelength range of interest for operation of the finished microoptical functional unit.

8. The process as claimed in claim 1, wherein optically functional sections which are molded on at least one of the at least two flat parts as lens surfaces, are formed.

9. The process as claimed in claim 8, wherein the lens surfaces are made as cylinder lenses which essentially extend over an entire surface of the at least two flat parts.

10. The process as claimed in claim 1, wherein optically functional sections made on at least one of the at least two flat parts, in at least one direction which lies in a surface of the at least two flat parts, have properties which differ from one another relative to one optical parameter, wherein microoptical functional units, with different properties, can be cut out of the interconnected at least two flat parts.

11. The process as claimed in claim 10, wherein properties of the optically functional sections on at least one of the at least two flat parts vary over the surface of at least one of the at least two flat parts, such that the microoptical functional unit with the desired properties can be cut out of the interconnected at least two flat parts using an addressable selection process.

12. The process as claimed in claim 10, wherein over the surface of at least one of the at least two flat parts, an index of refraction of the material used or a focal length of the optically functional sections which are made as lens surfaces can be varied.

\* \* \* \* \*

UNITED STATES PATENT AND TRADEMARK OFFICE
CERTIFICATE OF CORRECTION

| | |
|---|---|
| PATENT NO. | : 6,621,638 B2 |
| APPLICATION NO. | : 09/989082 |
| DATED | : September 16, 2003 |
| INVENTOR(S) | : Vitalij Lissotschenko |

It is certified that error appears in the above-identified patent and that said Letters Patent is hereby corrected as shown below:

Title page item [73] insert

The assignee should read

--Hentze-Lissotschenko Patentverwaltungs GmbH & Co. KG--

Signed and Sealed this

Seventeenth Day of April, 2007

JON W. DUDAS
*Director of the United States Patent and Trademark Office*